United States Patent [19]

Ferrante

[11] Patent Number: 4,515,456

[45] Date of Patent: May 7, 1985

[54] TANK FOR THE TREATMENT OF OFFSET PLATES BY ULTRASOUNDS

[75] Inventor: Mario Ferrante, Maxeville, France

[73] Assignee: Photomeca S.A., Maxeville

[21] Appl. No.: 610,578

[22] Filed: May 15, 1984

[30] Foreign Application Priority Data

Jun. 2, 1983 [FR] France ................................ 83 09144

[51] Int. Cl.[3] ................................................ G03B 3/04

[52] U.S. Cl. .................................... 354/320; 354/328; 134/184; 366/127

[58] Field of Search ............... 354/320, 321, 322, 324, 354/328, 319; 134/184; 366/127

[56] References Cited

U.S. PATENT DOCUMENTS 2,945,760 7/1960 Ostergaard .......................... 354/328
3,702,795 11/1972 Wessells et al. .................... 134/184
4,239,387 12/1980 Ahrens ................................ 354/328

FOREIGN PATENT DOCUMENTS 2075372 11/1981 United Kingdom ................ 354/328

*Primary Examiner*—A. A. Mathews
*Attorney, Agent, or Firm*—Murray, Whisenhunt & Ferguson

[57] ABSTRACT

The present invention relates to a tank for the treatment of offset plates by ultrasounds. An elongated rectilinear passageway is limited by a lower wall constituted by a vat with a peripheral flange and by an upper wall constituted by an inverted vat with a peripheral flange, a seal incorporating an elastic lip being tightened between inlet and outlet openings, a bath reservoir being formed in one of the vats to contain an ultra-sound generator, so that the plates to be treated, propelled by pairs of rollers, pass through the developer bath whose volume is minimum, in a straight line.

10 Claims, 4 Drawing Figures

TANK FOR THE TREATMENT OF OFFSET PLATES BY ULTRASOUNDS

The present invention relates to a tank intended for the automatic development in a suitable bath of positive and negative plates coated on at least one of their faces with a photosensitive layer, as used in printing and particularly in offset printing.

When the photosensitive layer of such a plate has been subjected to appropriate radiation, which has for its effect to harden it or soften it in zones not protected from the radiation, the purpose of the development is to eliminate those parts of the layer which will not serve for printing.

One advantageous process consists in circulating the plates in the bath whilst the latter is stirred by at least one ultra-sound generator. The plates are sometimes thin and of relatively reduced dimensions and they can therefore be easily made to follow a curved passage through the bath. However, there also exist rathermore rigid plates of large dimensions which are impossible to curve.

In addition, it is desirable that the bath used has a volume which is as small as possible; similarly, it is necessary to avoid any loss of the bath when a rigid plate which cannot be curved is passed therethrough.

It is a principal object of the invention to provide a tank for treatment, in a bath of minimum volume, stirred by ultrasounds, of supple or rigid plates with photosensitive layer, passing through the bath without being curved, without loss of this bath.

This purpose is attained from a tank adapted to contain a bath of developer for developing plates with photosensitive layer, equipped with an ultra-sound generator stirring this bath, in which, according to the invention, there is an elongated rectilinear passageway for circulation, of length shorter than the shortest plate, limited by a lower wall and an upper wall containing therebetween said bath without air pocket, with an inlet opening at one end and an outlet opening at the opposite end, at least one supple lip seal being disposed in one and the other opening; support means are mounted, if necessary, between the lower wall and the upper wall at the level of the two openings, a bath reservoir is connected to the elongated passageway and placed in communication therewith by a communicating opening made in either one of the upper wall and the lower wall, this reservoir containing the ultra-sound generator.

The bath reservoir is preferably mounted directly above the upper wall or directly below the lower wall.

The support means are preferably spaced apart by free spaces in the direction of circulation of the plates through the bath.

According to a preferred embodiment of the invention, the lower wall is shaped as a vat having along its edge a horizontal peripheral flange in position of use, the upper wall is shaped as a vat shallower than the lower vat likewise having along its edge a horizontal peripheral flange in position of use, the two vats are assembled on each other, a supple lip seal being interposed between the two peripheral flanges in the zone of the inlet and in the outlet zone and a seal made of solid material is tightened between the two flanges outside these zones.

The bath reservoir forms an integral part of one or the other vat thanks to a deeper forming or stamping made in part of this vat, preferably the downstream part in the direction of circulation of the plates.

According to a variant embodiment, a bath reservoir forms an integral part of one and the other vat.

When the bath reservoir forms an integral part of the lower vat, the tank is supplied via a supply pipe which opens out at the top of the upper vat.

Support means are placed in the inlet opening and in the outlet opening, on the flange of the lower vat, and the lip seal is mounted between the peripheral flange of the upper vat and the support means of each opening.

The invention will be more readily understood on reading the following description with reference to the accompanying drawings, in which.

Figure 1:
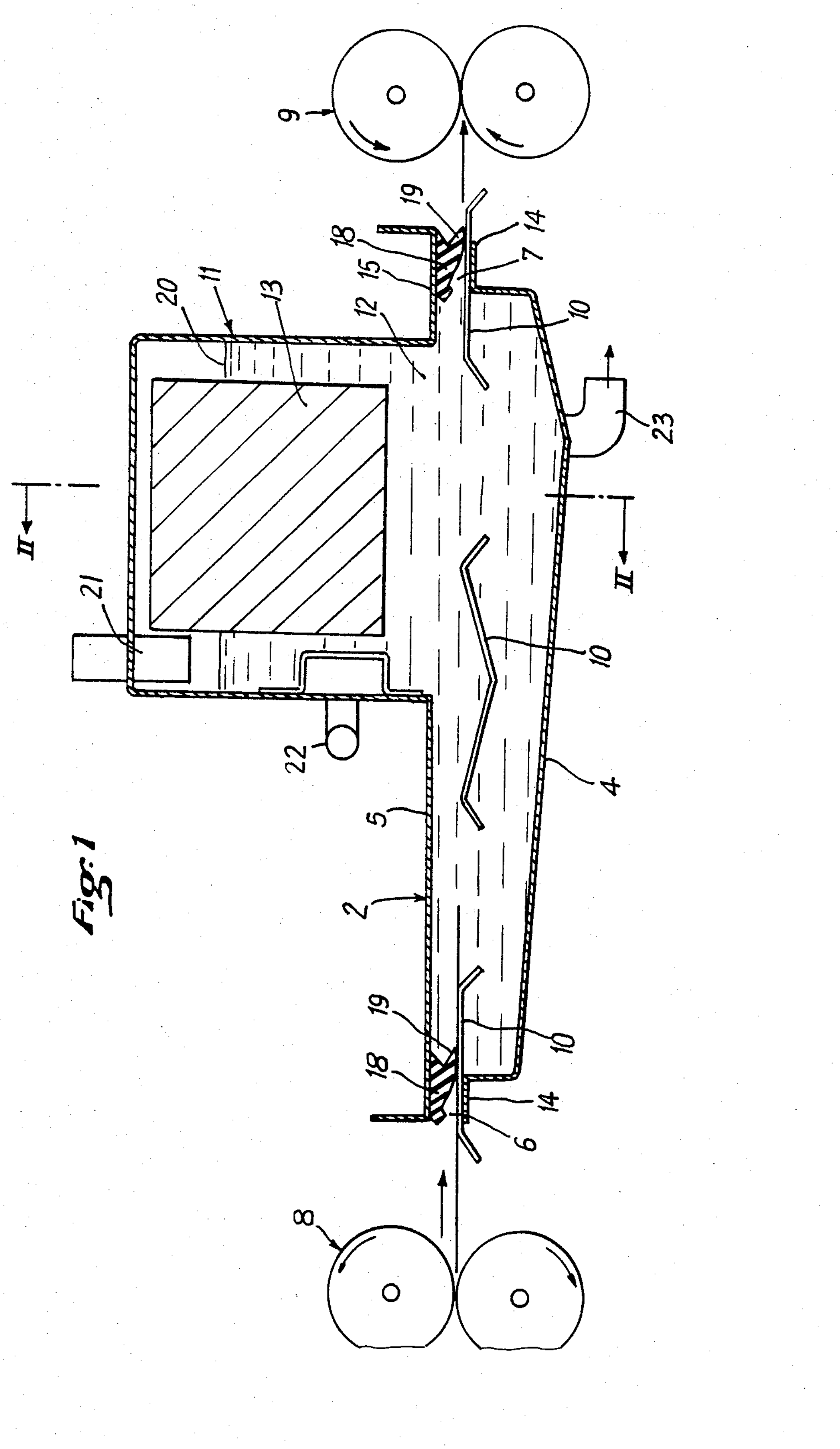
FIG. 1 is a view in section through a vertical plane passing through the longitudinal axis of a developing tank according to the invention.
Figure 2:
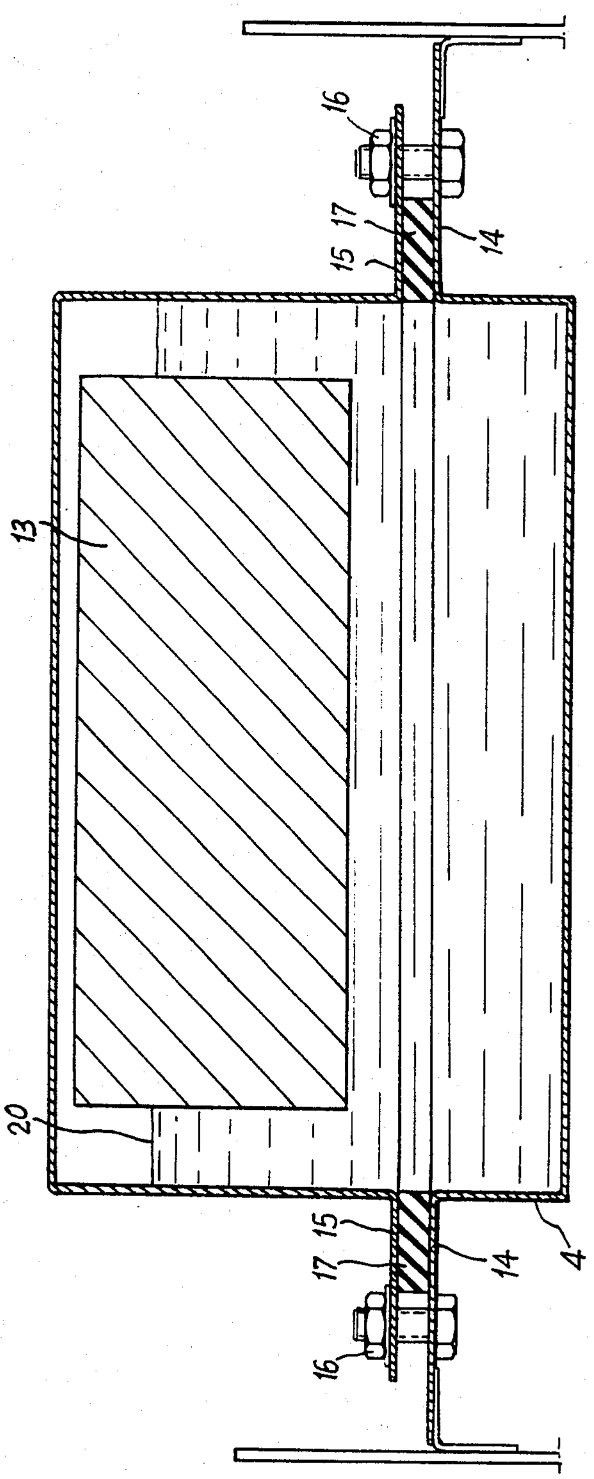
FIG. 2 is a view in section along II—II of FIG. 1.

Referring now to the drawings, the tank 1 illustrated in FIGS. 1 and 2 presents an elongated rectilinear passageway 2 for circulation of plates 3 to be treated, limited by a lower wall 4 and an upper wall 5; these two walls 4, 5 also limit therebetween an inlet opening 6 at one end and an outlet opening 7 at the opposite end. The distance separating the two openings 6, 7 is chosen to be less than the length of the shortest plate to be treated. Outside the tank 1, a first pair 8 of two drive rollers is placed opposite the inlet opening 6, parallel thereto, and a second pair 9 of drive rollers is similarly placed opposite the outlet opening 7. Any plate 3 to be treated is engaged in the first pair 8 of rollers and propelled thereby through the inlet opening 6, then along the passageway 2, to leave through the outlet opening 7 and be gripped by the second pair 9 of rollers.

Support means 10 are preferably disposed in the elongated passageway 2, in spaced apart relationship in the direction of circulation of the plates 3. These means 10 may be constituted by a simple flat bearing plate, or by a bent or curved plate so that it comes into contact with the plates 3 only by transverse lines, or by freely rotating cylinders mounted transversely to the elongated passageway 2. In the example described here, support means 10 constituted by a simple flat bearing plate are disposed in the inlet opening 6 and in the outlet opening 7 to offer a better guiding at the inlet and outlet and to procure a greater bearing surface for seals, as will be explained hereinbelow.

The elongated passageway 2 is placed in communication with a bath reservoir 11; communication is effected via a communicating opening 12 preferably made in the upper and lower walls 5 and 4, either in only one of these walls or in both, in their part close to the outlet opening 7. An ultra-sound generator 13 is disposed in the bath reservoir 11.

In the example of FIGS. 1 and 2, the communicating opening 12 is provided in the upper wall 5.

A tank according to the invention is advantageously constituted by a lower vat having along its upper edge an outer peripheral flange 14 which is horizontal in position of use. Similarly, there is an upper vat, shallower as a whole than the lower vat, also having an outer peripheral flange 15 which is horizontal in position of use. It is even possible, as may be seen in FIG. 1, that the upper wall 5 and the flange 15 lie in the same plane in the front part which extends from the inlet opening 16.

Figure 3:
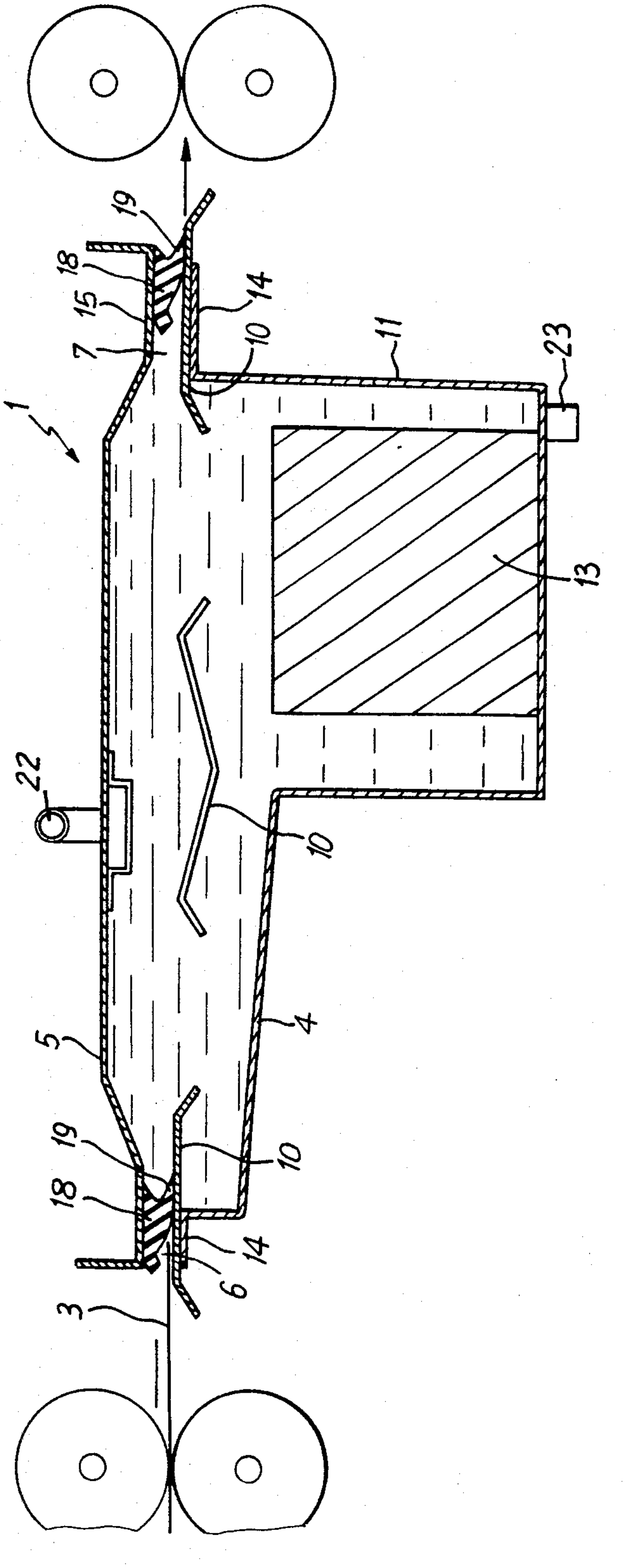
FIG. 3 is a view in section similar to FIG. 1 of a first variant embodiment.
Figure 4:
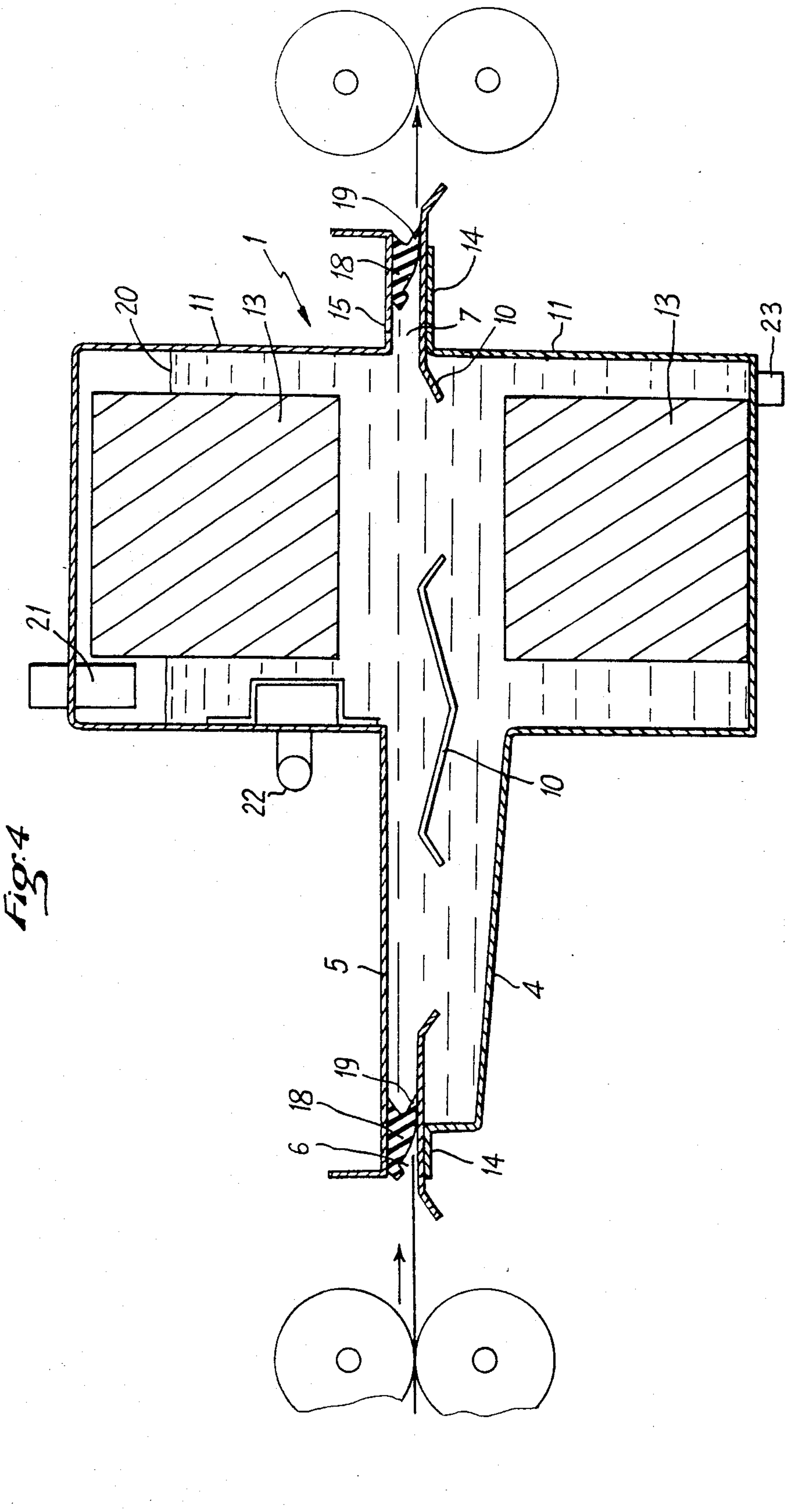
FIG. 4 is a view in section similar to FIG. 1 of a second variant of the invention.

These vats are obtained by stamping sheet metal or by forming a sheet of plastics material. The bath reservoir 11 is formed by a deeper stamping or forming in the rear part. It is therefore easy to form the bath reservoir 11 either on the upper vat (FIG. 1) which constitutes the upper wall 5 of the elongated passageway 2, or on the lower vat (FIG. 3) which constitutes the lower wall 4, or on one and the other vat, on the two walls 4 and 5 of the elongated passageway 2 (FIG. 4).

A tank 1 with one or two bath reservoirs 11 is easily obtained by assembling a lower vat with an inverted upper vat, with the aid of their peripheral flanges 14, 15, by compressing therebetween, by means of bolts 16, a seal 17 made of solid material, outside the zones of the inlet and outlet openings 6 and 7. In these latter is placed a seal 18 incorporating an elastic lip 19. This seal 18 is preferably fixed, for example by means of an adhesive, to the flange 15 of the upper vat. The elastic lip 19 then bears on the flange 14 of the lower vat. However, it is preferable to mount in each inlet opening 6 and outlet opening 7 a support means 10 which projects beyond the flange 14 inwardly and outwardly and against which the elastic lip 19 bears. In both openings 6, 7, the lips 19 are directed in the direction of circulation of the plates 3 which raise them on entering the bath and on leaving it.

In all embodiments, the elongated passageway 2 is completely filled with bath between the two walls 4, 5 without any volume of air. When the tank 1 comprises only one bath reservoir 11 incorporated in the upper vat (FIG. 1), the free level 20 of the bath may lie in this reservoir and be maintained constant by means of a level detector 21. The developer bath then enters the lower part of reservoir 11, via a pipe 22. When the tank 1 comprises two reservoirs 11, an upper one and a lower one (FIG. 4), the free level 20, the level detector 21 and the supply pipe 22 are located on the upper vat.

When the tank 1 comprises one sole lower reservoir 11 (FIG. 3), there is no free level of the bath; the inlet pipe 22 of the bath opens out in the upper wall 5 of the tank.

In all three cases, an evacuation pipe 23 is provided which leaves from the lowest point of the lower vat or of the lower reservoir 11 when the latter exists, in that part of the tank close to the outlet opening 7.

A tank 1 of any one of the three types may be obtained by assembling two suitable vats together; an existing tank may easily be modified by replacing one of the vats.

The ultra-sound generator 13 is available on the market. It is mounted in one or the other of the bath reservoirs 11, or in the two reservoirs 11 when it is envisaged to treat plates provided with a photosensitive layer on their opposite two faces.

What is claimed is:

1. A tank incorporating an ultra-sound generator for the treatment, in a bath of developer stirred by ultrasounds, of plates with photosensitive layer passing through this bath, wherein it comprises an elongated rectilinear passageway having a lower wall and an upper wall containing therebetween the developer bath, with an inlet opening at one end and an outlet opening at the opposite end, these openings being spaced apart by a length shorter than the length of the shortest plate to be treated, at least one supple lip seal being disposed in each of these openings, at least one bath reservoir containing the ultra-sound generator being in communication with this elongated rectilinear passageway by a communicating opening, means for propelling the plates along the passageway being placed near the inlet and outlet openings.

2. The tank of claim 1, wherein support means are disposed between the lower wall and the upper wall at the level of the two inlet and outlet openings.

3. The tank of claim 2, wherein the support means are spaced apart in the direction of circulation of the plates through the bath.

4. The tank of claim 2, wherein support means constituted by a flat plate are disposed in the inlet opening and in the outlet opening and the elastic lip of the seals bears against this flat plate.

5. The tank of claim 1, wherein the bath reservoir is located on the upper wall above the communicating opening made in the latter.

6. The tank of claim 1, wherein the bath reservoir is located on the lower wall below the communicating opening made in the latter.

7. The tank of claim 1, wherein a first bath reservoir is located on the upper wall above the communicating opening made in the latter and a second bath reservoir is located beneath the lower wall below the communicating opening made in the latter.

8. The tank of claim 1, wherein the lower wall forms part of a vat having along its free edge a peripheral flange, the upper wall forms part of a vat having along its free edge a peripheral flange, these two vats being assembled together by their flanges, the vat constituting the upper wall being inverted, a seal being tightened between the peripheral flanges outside the zones of the inlet and outlet openings.

9. The tank of claim 8, wherein the or each bath reservoir forms an integral part of the vat further to a deeper forming or stamping of this vat in a part of the wall limiting the elongated rectilinear passageway.

10. The tank of claim 1, wherein a first pair of rollers and a second pair of rollers are disposed respectively opposite the inlet opening and the outlet opening outside the rectilinear passageway in order to propel the plates to be treated in this passageway.

* * * * *